(12) United States Patent
Ghani et al.

(10) Patent No.: US 8,762,180 B2
(45) Date of Patent: Jun. 24, 2014

(54) CLAIMS ANALYTICS ENGINE

(75) Inventors: Rayid Ghani, Chicago, IL (US); Leana R Wallace, San Francisco, CA (US); Michael S Irish, San Francisco, CA (US); Ajay K Easo, Chicago, IL (US); Mohit Kumar, Chicago, IL (US); Zhu-Song Mei, Chicago, IL (US); Dmitriy Feferman, Chicago, IL (US); Nicholas F Howell, San Marino, CA (US); Lindsey J Lizardi, State College, PA (US); Laura J Jantzen, Greenwood Village, CO (US)

(73) Assignee: Accenture Global Services Limited, Dublin (IE)

( * ) Notice: Subject to any disclaimer, the term of this patent is extended or adjusted under 35 U.S.C. 154(b) by 177 days.

(21) Appl. No.: 12/547,110

(22) Filed: Aug. 25, 2009

(65) Prior Publication Data

US 2011/0054925 A1    Mar. 3, 2011

(51) Int. Cl.
  *G06Q 40/00*   (2012.01)
(52) U.S. Cl.
  USPC .......................................................... 705/4

(58) Field of Classification Search
  USPC ......................................................... 705/2–4
  See application file for complete search history.

(56) References Cited

U.S. PATENT DOCUMENTS

| | | | |
|---|---|---|---|
| 7,813,944 B1 * | 10/2010 | Luk et al. | 705/4 |
| 2005/0108063 A1 * | 5/2005 | Madill et al. | 705/4 |
| 2006/0129427 A1 * | 6/2006 | Wennberg | 705/2 |
| 2008/0004915 A1 * | 1/2008 | Brown | 705/4 |
| 2008/0249820 A1 * | 10/2008 | Pathria et al. | 705/7 |
| 2009/0222290 A1 * | 9/2009 | Crowe | 705/4 |

FOREIGN PATENT DOCUMENTS

| | | |
|---|---|---|
| JP | 2005-242472 | 8/2005 |
| JP | 2008-134756 | 6/2008 |
| WO | WO 01-13295 A1 | 2/2001 |
| WO | 2009073151 A1 | 6/2009 |

* cited by examiner

*Primary Examiner* — Valerie Lubin (57) ABSTRACT

Methods and systems for processing claims (e.g., healthcare insurance claims) are described. For example, prior to payment of an unpaid claim, a prediction is made as to whether or not an attribute specified in the claim is correct. Depending on the prediction results, the claim can be flagged for an audit. Feedback from the audit can be used to update the prediction models in order to refine the accuracy of those models.

18 Claims, 4 Drawing Sheets

CLAIMS ANALYTICS ENGINE

BACKGROUND

Processes used by healthcare claims payers are manually intensive and inconsistently executed, and are subject to error, fraud, and abuse. As a result, healthcare administrators have difficulty identifying and preventing claim payment errors. Currently, about 30 percent of the expense of administering claims is associated with back-end operations and support, particularly activities associated with "reworking" claims. That is, a great deal of expense is associated with auditing claims to identify payment errors, handling provider and patient complaints when underpayments are made, and contacting providers and patients to recover overpayments. These costs are ultimately borne by customers (both providers and patients), and errors in processing claims can also result in increasing customer dissatisfaction.

SUMMARY

Embodiments according to the present invention pertain to an analytical tool that can be utilized in, for example, the healthcare industry but can also be applied outside the healthcare industry. Using healthcare as an example, the analytical tool is used to address problems with reworking claims, such as but not limited to payment issues (e.g., overpayment or underpayment of claims). Importantly, the analytical tool is intended to identify claims that have a high probability of being problematic so that those claims can be proactively reconciled, thus avoiding or reducing the cost and effort of reworking erroneous claims.

The analytical tool is generally characterized as a predictive, learning, and real-time system of models. To develop the tool, information is collected from a number of disparate sources and transformed into a useful format. The information can include relatively unstructured text and semantic data collected from a variety of sources, as well as structured (e.g., numerical, statistical) data read from standardized claim forms. The information is analyzed using methods such as segmentation, classification, etc., to create predictive models that have the capability to continuously learn—that is, the models can be continually improved as new information is collected and as more claims are evaluated.

In practice, as an example, claims known to have resulted in a payment error can be analyzed using the inventive analytical tool, and attributes of those claims can be compared against those of other claims to identify additional claims that may also result in a payment error. Those additional claims can be identified to an auditor (automated or human), so that any errors in the claims can be corrected before payment; if payment has been made, then errors can be proactively rectified. Feedback from the auditor is incorporated into the analytical tool, in this manner refining the accuracy of the tool for application to subsequent claims.

By automatically detecting claims that may require rework (correction or adjustment) in advance, customer relations can be improved, and administrative efforts and costs can be reduced.

These and other objects and advantages of the present invention will be recognized by one skilled in the art after having read the following detailed description, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention. Like numbers denote like elements throughout the drawings and specification.

DETAILED DESCRIPTION

In the following detailed description of embodiments according to the present invention, numerous specific details are set forth in order to provide a thorough understanding of those embodiments. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "combining," "incorporating," "identifying," "extracting," "predicting," "deriving," "flagging," "evaluating," "updating," "comparing," "applying," "quantifying," "associating," "selecting" or the like, may refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

Figure 1:
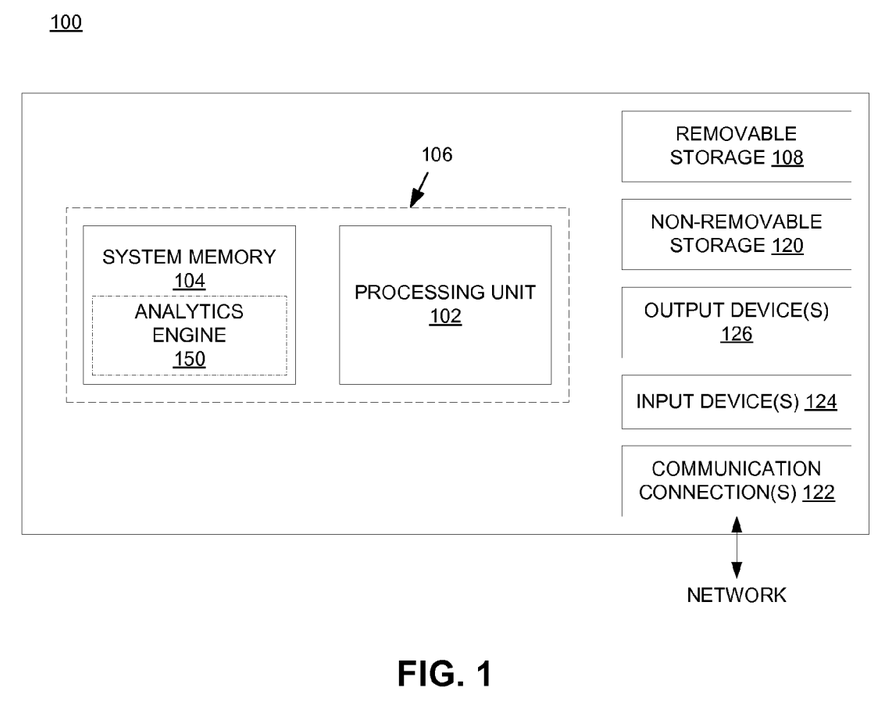
FIG. 1 is a block diagram of an example of a computer system upon which embodiments of the present invention can be implemented.

FIG. 1 shows a block diagram of an example of a computer system 100 upon which the embodiments described herein may be implemented. In its most basic configuration, the system 100 includes at least one processing unit 102 and memory 104. This most basic configuration is illustrated in FIG. 1 by dashed line 106. The system 100 may also have additional features/functionality. For example, the system 100 may also include additional storage (removable and/or non-removable) including, but not limited to, magnetic or optical disks or tape. Such additional storage is illustrated in FIG. 1 by removable storage 108 and non-removable storage 120. The system 100 may also contain communications connection(s) 122 that allow the device to communicate with other devices.

Generally speaking, the system 100 includes at least some form of computer-usable media. Computer-usable media can be any available media that can be accessed by the system 100. By way of example, and not limitation, computer-usable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed by the system 100. Any such computer storage media may be part of the system 100. The memory 104, removable storage 108 and non-removable storage 120 are all examples of computer storage media.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media. The communications connection(s) 122 is/are an example of communication media.

The system 100 may also have input device(s) 124 such as keyboard, mouse, pen, voice input device, touch input device, etc. Output device(s) 126 such as a display, speakers, printer, etc., may also be included.

The system 100 may operate in a networked environment using logical connections to one or more remote computers. When used in a networking environment, the system 100 can be connected to the network through the communication connection(s) 122.

In the example of FIG. 1, the memory 104 includes computer-readable instructions, data structures, program modules and the like associated with an analytics engine 150. However, the analytics engine 150 may instead reside in any one of the computer storage media used by the system 100, or may be distributed over some combination of the computer storage media, or may be distributed over some combination of networked computers.

The analytics engine 150 is generally characterized as a predictive, learning, and real-time system of models. In overview, the analytics engine (or analytical tool) 150 can be utilized in, for example, the healthcare industry, including but not limited to health insurance claim payers, hospitals, and physician groups. However, embodiments according to the invention are not limited to healthcare applications. Generally speaking, embodiments of the invention can be utilized in businesses, industries, and the like that utilize claims and other types of records, files, and forms (other than claim forms) on a regular basis. In addition to healthcare, embodiments according to the invention can be used to evaluate claims, records, files, and the like that are used for workman's compensation, property insurance, and casualty insurance, for example.

When processing claims, for example, the analytics engine 150 can be used to identify claims that have a high probability of being problematic so that those claims can be proactively reconciled, thus avoiding or at least reducing the cost and effort of reworking erroneous claims. In practice, claims known to include an error, or to have resulted in an error, can be analyzed using the analytics engine 150, and attributes of those claims can be compared against other claims to identify any other claims that may be associated with the same type of error. As an example, claims known to have resulted in a payment error can be analyzed using the analytics engine 150, and attributes of those claims can be used as the basis for identifying any other claims that may also result in a payment error. Claims identified as potentially being problematic can be submitted to an auditor (human or automated), so that any errors can be corrected before handling of the claim is completed (e.g., before payment). If the claim has been settled or finalized (e.g., payment has been made), then errors can be proactively rectified. Feedback from the auditor is incorporated into the analytics engine 150, in this manner refining the accuracy of the tool for subsequent application to other claims.

Elements and functionalities associated with the analytics engine 150 are presented in detail below. The analytics engine 150 can be utilized in a training process (see FIG. 2) and/or in a deployment process (see FIG. 3).

Figure 2:
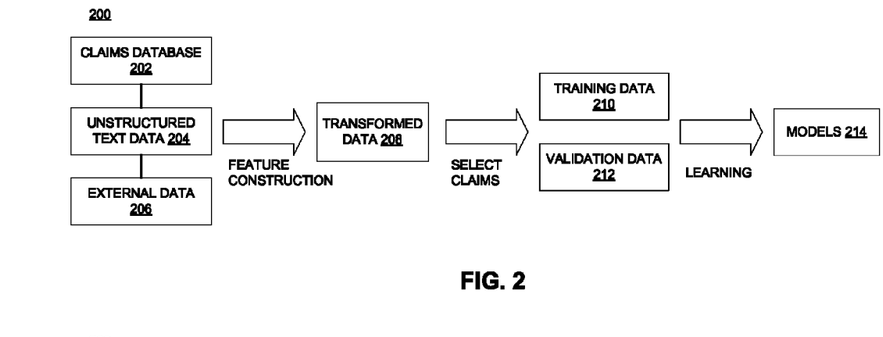
FIG. 2 is an embodiment of a training process that can be implemented by an analytical tool according to the invention.

FIG. 2 shows an embodiment of a training process 200 that can be implemented using the analytics engine 150 according to the present invention. Process 200 can be implemented as computer-readable instructions stored in a computer-usable medium.

In the FIG. 2 embodiment, the analytics engine 150 accesses a claims database 202. The claims database 202 can include paid and/or unpaid claims, claims that have been audited, claims that have not yet been audited, claims that have been finalized/settled, and claims that are pending. In the training process, consideration of claims that have been audited can be important because the lessons learned from those claims can be incorporated into the prediction models 214 that are discussed below.

In a healthcare implementation, the claims are, in general, stored in a standardized, computer-usable (computer-readable) format, such as a format based on Health Care Financing Administration (HCFA) Form 1500 or Uniform Billing (UB) Form 92. The information in the claims database 202 may be referred to herein as "first historical information."

The analytics engine 150 can also access information such as unstructured text data 204 and external data 206. Generally speaking, unstructured text data 204 and external data 206 encompass information not included in the claims database 202. As will be seen from the discussion below, an objective of the training process 200 is to develop models that can be used to predict whether or not a claim contains accurate information—in general, a purpose of the analytics engine 150 is to identify potentially problematic claims and intercept those claims before payment (as noted above, the tool can also be used to identify potentially problematic claims after payment). A prediction can be made by correlating information in a claim to information that is known to be correct and/or information that is known to be incorrect, weighted by other types of information found to be interesting by virtue of that information's value as an error predictor or marker. In general, unstructured text data 204 and external data 206 constitute those "other types of information," and as such they include a wide variety of different types of information.

Unstructured text data 204 and external data 206 can be based on, for example, dispute information, provider call information, recovery information, and audit result information. Unstructured text data 204 may further include information such as, but not limited to, doctor's notes, auditor's notes, notes from customer service calls, etc. External data 206, in general, includes other information that is not included in the claims and is not already included in the unstructured text data 204. External data 206 may include information such as, but not limited to, Web-based information or information from other sources that are up-to-date—for example, information that a certain area of a country or the world is experiencing a flu outbreak may be included in the external data. External data 206 may also include information from various public or private databases that may be freely available or may be sold commercially.

The types of information included in the unstructured text data 204 and the external data 206, as well as the information itself, may be dynamic. For example, information about the aforementioned flu outbreak may be considered relevant for a period of time but may become less and less relevant, and thus may be weighted less or discarded. Unstructured text data 204 and external data 206, as well as any other information not included in the claims database 202 or not derived from the information in the claims database, may be collectively referred to herein as "second historical information."

The information in the data sources—the claims database 202, the unstructured text data 204, and the external data 206—is used as the basis for identifying features that are expected to be useful in identifying problematic claims. A "feature," generally speaking, is a named parameter or variable; a value for the feature is obtained from or derived from the aforementioned data sources on a per-claim basis (although a feature may have the same value for a group of claims).

Features may be based on the type of entries included in the data sources—for example, the patient's age, the doctor's name, a contract number, an insurance code, a monetary amount, and an address can be read directly from the data sources. Features may also be derived from the types of information included in the data sources—for example, the number of days between the time when a medical procedure was performed and the time when the claim is submitted, the number of days between claim receipt and data processing, the procedure code that had the highest billed amount in a claim, the amount paid for a particular procedure minus the average amount paid for that procedure over the past six months and then divided by the standard deviation for the amount paid for that procedure over the same six months, or the cost of a particular type of medication averaged over a group of doctors or over a particular geographical region over a period of time, may be considered useful features that can be determined using the information included in the data sources.

The transformed data 208 includes values for the chosen features. The transformed data 208 may include the claims themselves (paid and unpaid, audited and not audited, settled and pending), actual data that is parsed from the aforementioned data sources, and derived data that is determined by manipulating, translating, or mining the actual data.

A variety of analytical techniques can be used, individually and jointly, to generate the transformed data 208. These techniques include, but are not limited to, machine learning techniques.

Machine learning techniques include text mining, data mining, neural networks, and natural language processing. Examples of machine learning techniques include, but are not limited to, linear perception, support vector machines, decision trees, and Naive Bayes. These techniques can each be used to more quickly evaluate unstructured data; identify and delineate interesting segmentations, groupings and patterns in the data; and facilitate further human understanding and interpretation of large sets of data. Machine learning techniques can rely on advanced statistical methods like linear and non-linear regression techniques, as well as non-statistical methods like decision trees, segmentation, classification, and neural networks. Using machine learning techniques, the unstructured data 204 and external data 206 can be searched to find data that matches or satisfactorily matches a specified text string, for example.

Essentially, the portion of the process 200 described to this point constitutes aspects of an ETL (extract, transform, load) process. Accordingly, disparate data in a variety of different formats from a variety of different sources can be transformed into a useful and relatively standardized format.

In the example of FIG. 2, the transformed data 208 is separated into training data 210 and validation data 212. The training data 210 can be used to develop the models 214. The models 214 are essentially qualification or regression models that implement machine learning techniques to evaluate the transformed data 208 in order to calculate a probability, and perhaps an associated confidence level, that a claim contains an error. Once developed, the models 214 can be validated using the validation data 212.

More specifically, the training data 210 is used to develop correlations between the features included in the transformed data 208 and the likelihood that a particular claim is either correct or incorrect. Embodiments according to the invention can be used to detect various types of errors, not just errors associated with payment/reimbursement. For example, an error in one or more of the claim attributes can be identified—e.g., an error in a contract number, procedure code, etc., specified in the claim, as well as any monetary amount included in the claim, may be detected and identified.

However, it may be that only a certain characteristic of the claim is of interest. For example, if the desired goal is accurate reimbursement of money owed to a provider or patient, then the claim may be classified as incorrect only if a monetary amount included in the claim is incorrect, or if some other claim attribute that affects proper reimbursement is incorrect, or if some claim attribute that is an accurate predictor of a potential reimbursement error has a certain value or is itself erroneous. Thus, in one implementation, the various types of errors that are identified can be filtered in order to focus on a particular type of error (e.g., payment/reimbursement errors).

Each feature included in the training data 210 can be appropriately considered and assessed using the various analytical techniques mentioned above, until one or more models 214 are produced. In practice, many different models are produced. The models 214 use the value associated with a particular feature, or the values associated with a particular combination of features, to calculate a probability that a particular claim is problematic (e.g., the claim may contain an error, or may contain information that results in an error). The models 214 can also be used to calculate a confidence level associated with the calculated probability. Once the training data 210 can be satisfactorily predicted using the models 214—that is, once problematic claims can be identified to a satisfactory level of confidence—then the validation data 212 can be used to independently test and verify the accuracy of the models. Model development is an iterative process between training and validation that proceeds until the validation data 212 is satisfactorily predicted.

Figure 3:
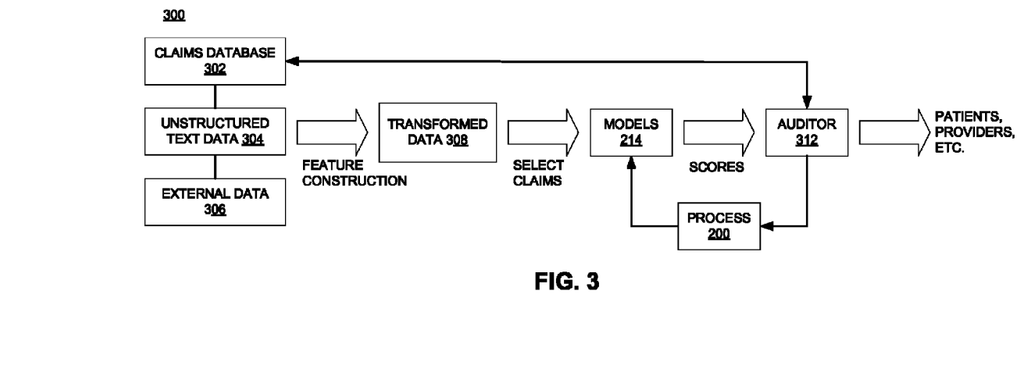
FIG. 3 is an embodiment of a deployment process that can be implemented by an analytical tool according to the invention.

With reference now to FIG. 3, an embodiment of a deployment process 300 that can be implemented using the analytics engine 150 according to the present invention is shown. Process 300 can be implemented as computer-readable instructions stored in a computer-usable medium.

In the FIG. 3 embodiment, the analytics engine 150 accesses a claims database 302. The type of content in the claims database 302 is similar to that of the claims database 202 (FIG. 2), but the claims in the deployment process 300 are different from, or in addition to, the claims used in the training process 200.

In a healthcare claims payer example, the claims database 302 can include claims that have been paid as well as claims that have not yet been paid. In general, the claims database 302 can include claims that have been processed/finalized, and claims that have not yet been processed or that are undergoing processing. More generally, the analytics engine 150 can be used to evaluate any instantiated claim.

The analytics engine 150 can also access information such as unstructured text data 304 and external data 306 of FIG. 3. The unstructured text data 304 and external data 306 are, in general, similar to the respective elements described above in conjunction with FIG. 2 with regard to the type of content, but the unstructured text data 304 and external data 306 used in the deployment process 300 may be different from, or in addition to, the information used in the training process 200.

The data from the data sources 302, 304, and 306 of FIG. 3 is transformed into transformed data 308 based on the features identified during the training process 200 of FIG. 2. In other words, the transformed data 308 may include the claims themselves, actual data parsed from the FIG. 3 data sources, and derived data determined by manipulating, translating, or mining the actual data. Thus, generally speaking, relatively large and diverse sets of data (diverse in terms of both content and source) are accommodated and managed.

Continuing with reference to FIG. 3, for each claim selected from the claims database 302, the models 214 are applied to the corresponding transformed data 308 to calculate a probability that the claim is incorrect (or, conversely, is correct). In essence, each evaluated claim is scored. A single score may be assigned to the claim as a whole, or there may be multiple scores associated with the claim. In the latter case, for example, one or more attributes of a claim may be individually scored. In one embodiment, the claim's score can be compared to a conditional value such as a specified threshold value; if the score satisfies the conditional value (e.g., exceeds the threshold), then the claim can be forwarded to an auditor 312 for further evaluation (e.g., an audit). The audit can be implemented in an automated fashion (e.g., in software) by adhering to pre-established auditing rules. Alternatively, a human auditor can perform the audit.

As mentioned previously herein, there can be many different types of models 214. For example, the models 214 may be based on neural networks, regression logic (e.g., based on linear regression, logistic regression, polynomial regression, and/or kernel regression), and decision trees. One or more of the models 214 may be used to assess a claim. The models themselves may weight the various claim attributes to calculate a result, and the results from each model may also be weighted.

In the audit, a potentially problematic claim can be reviewed and decision made as to whether the claim is in fact erroneous. Feedback from the auditor 312 can be incorporated into the models 214 in order to refine the accuracy of those models. For example, if the claim is indeed erroneous, then the auditor's feedback can be used to reinforce the accuracy of the models 214; if the claim is in fact not problematic (although predicted to be), then the auditor's feedback can be used to refine the models 214 so that erroneous predictions are less likely to occur during evaluations of subsequent claims. As shown in FIG. 3, the training process 200 can be repeated using feedback from the auditor 312 to refine (update) the existing models 214 or to develop (create) new, additional models. Generally speaking, the analytics engine 150 can be continually updated—as new results are generated from the deployment process 300, the training process 200 can be repeated to update the models 214. In this manner, the audit process helps teach the analytics engine 150 by reinforcing correct decisions and identifying incorrect ones.

The analytics engine 150 can also be updated because of temporal changes. For example, payer practices or procedures may change for some reason—for example, the terms of a contract may change—and the analytics engine 150 can be updated accordingly. Furthermore, as experience is gained through the deployment process 300, new claim attributes or features of interest may be identified and added to the models 214, and new models may be developed.

In one embodiment, in addition to generating a score for a claim of interest, the analytics engine 150 also generates comments or explanations that accompany the claim and are specific to that claim. The comments may take a variety of forms such as those described below.

In one implementation, a human auditor is presented with an online (electronic, displayed) version of the claim form, with potentially problematic items in the claim highlighted in some manner. For example, potential errors in the claims can be presented in a different color, or have a different background color, relative to other items in the claim. The degree of coloration can be varied to reflect the degree of probability of a potential error. For example, items that are more likely to be incorrect can be displayed using a darker or brighter color relative to items less likely to be incorrect. For example, if the analytics engine 150 indicates that a monetary amount in the claim is possibly in error, then in addition to highlighting that amount, the attribute(s) of the claim that triggered the identification of that error can also be highlighted to varying degrees.

In another implementation, the auditor is provided with a text-based explanation of why a claim, or an attribute of the claim, may be incorrect. As the number of claims evaluated by the analytics engine 150 increases, recurring problems/errors can be identified and uniformly described. In other words, in one embodiment, a set of standard comments is generated; these standard comments may each be associated with a respective numerical code or key that in turn is associated with an appropriate text-based explanation. These standard comments provide a plain language explanation of the potential problem with or error in a claim. Once an error is identified, the set of standard comments can be automatically reviewed to determine which comment, if any, is probably the most appropriate, and the selected comment can be provided to the auditor along with the potentially problematic claim. While auditing the claim, the auditor can also audit the appropriateness of the selected comment and provide feedback to the analytics engine 150 in that regard. The feedback about the comment can be used to refine the part of the analytics engine 150 that selects comments so that, in subsequent claim evaluations, the appropriate comment is more accurately selected.

The additional information provided to the auditor is not necessarily limited to an explanation highlighting one or more attributes of the claim. An explanation can also be associated with information (e.g., a feature or features) derived from those attributes. An explanation can also be associated with the claim in general, in order to broadly characterize the claim; for example, the explanation may label a claim as an underpayment or overpayment.

Thus, generally speaking, auditors can be presented with information that helps them identify the reason(s) why a claim was flagged and what aspect(s) of the claim should probably be the focus of the audit. Such information can be about the claim, about an attribute of the claim, or about a feature derived from an attribute of the claim.

In one embodiment, instead of providing all potentially problematic claims to the auditors, only certain claims are forwarded. More specifically, only those claims deemed to be more important, or the most important, may be provided to auditors. Different criteria can be applied to identify which claims are the most important. In one implementation, those claims that would result in the most improvement to the analytics engine 150 are deemed to be the most important claims. For example, those claims that would result in the greatest improvement in prediction accuracy would be deemed the most important. The most important claims can be, for example, those claims that represent a large number of identical or similar claims, or the claims that have the potential for confusing the analytics engine because the probability that they are erroneous is very close to the threshold value mentioned above. Claims that may result in the greatest cost savings, either directly or indirectly, if correctly identified as problematic may also be considered important. For example, substantial cost savings may result if erroneous claims that are more likely to result in a phone call to a service center are intercepted and corrected before payment is mailed—by reducing the number of such claims, perhaps the size of the call center can be reduced to reduce costs.

In one embodiment, to identify the most important problematic claims, a measure of the improvement in the accuracy of the analytics engine 150, assuming those claims were correctly predicted, is quantified. For example, for a potentially problematic claim identified as such, the effect on the analytics engine 150 can be simulated in the background (e.g., by executing the training process 200 in parallel with the deployment process 300), with the simulation based on an assumption that the claim at issue has been properly characterized as correct/incorrect. Claims that have the largest impact on system accuracy are forwarded to the auditors. For example, as mentioned above, a measure of improvement can be calculated per claim; in such an implementation, only those claims whose measure is greater than a threshold value are forwarded to auditors.

In another embodiment, once a properly predicted claim—that is, a claim that is properly predicted as being correct or, perhaps of greater interest, a claim that is properly predicted as being problematic—is identified, an auditor can request additional claims that are similar to that claim. A similar claim may include attributes that are, at least to some degree, identical to the properly predicted claim. If, for example, a particular attribute or feature of a properly predicted, problematic claim is identified as a source of error, then an auditor can request other claims that have the same value for that attribute or feature. An auditor can alternatively request, for example, other claims that received the same or similar scores as the processed claim. As noted previously herein, attributes of a claim can be individually scored; accordingly, an auditor can request other claims with an attribute or attributes that received the same or similar scores as the attribute(s) in the processed claim. Also, as noted previously herein, additional information (e.g., a standard explanation, perhaps text-based or identified by a numerical code) can be associated with a processed claim; accordingly, an auditor can request other claims associated with the same or similar additional information as that associated with the processed claim. In general, an auditor can use one or more attributes of any claim of interest, and/or the results associated with a processed claim, to define search criteria that can be used to identify and select other claims that may be of interest to the auditor. Even more generally, any information associated with any claim of interest can be used to search for, identify, and select another claim from the claims database 202 or 302.

Figure 4:
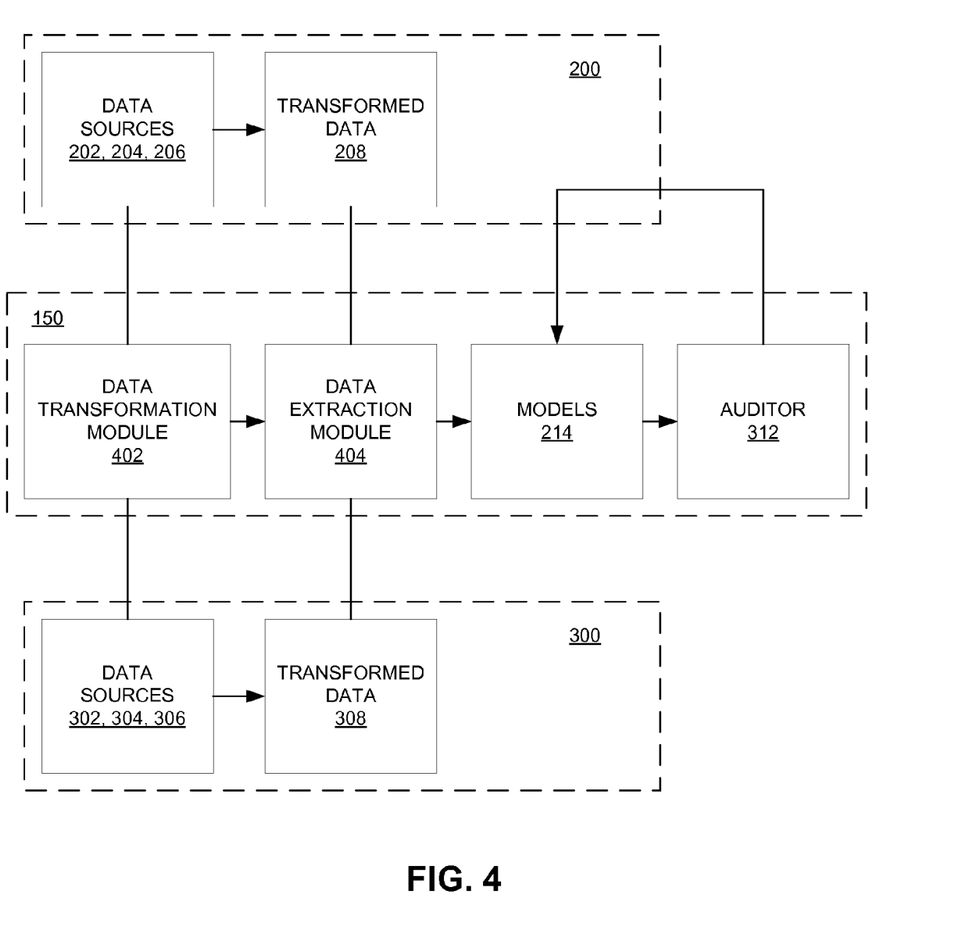
FIG. 4 is a block diagram showing an embodiment of a computer-implemented analytical tool according to the invention.

FIG. 4 is a block diagram showing elements of an embodiment of an analytics engine 150 according to the present invention. In one embodiment, the analytics engine 150 is implemented as computer-readable components residing on a computer-usable medium.

In the example of FIG. 4, the analytics engine 150 includes a data extraction module 404 and one or more predictive models 214. The data extraction module 404 can access the transformed data 308 and extract information associated with each claim being evaluated.

Claims selected for evaluation may be paid or unpaid, audited or not audited, pending or settled; in general, any instance of a claim, regardless of the claim's status, can be evaluated. Claims can be selected for evaluation in a variety of ways. In one implementation, all claims are evaluated. In other implementations, only selected claims are evaluated. In the latter implementations, claims can be selected at random, or they can be selected in response to queries, rules, or other specified selection (search) criteria. For example, once a claim has been identified as being potentially problematic, or after such a claim has been audited and confirmed as being problematic, parameters based on that claim can be defined to execute a search of the transformed data 308 (or of the claims database 302) in order to identify other claims that may be similarly problematic. Examples of other mechanisms for selecting claims for processing have been mentioned above. Claims selected as a result of such a search may bypass the models 214, proceeding directly to an audit stage (e.g., auditor 312).

As described above, the models 214 can be used to predict whether a claim is correct or incorrect. For example, the models 214 can predict whether a monetary value specified in each claim is correct. Furthermore, the models 214 can flag a claim for an audit if the claim is predicted to be incorrect, generate comments associated with each claim, and highlight aspects of a claim that may be of particular interest to an auditor, as previously described herein.

In one embodiment, the analytics engine 150 also includes a data transformation module 402 that can be used in the training process 200 to access the data sources 202, 204, and 206 and generate the transformed data 208, and that can be used in the deployment process 300 to access the data sources 302, 304, and 306 and generate the transformed data 308, as previously described herein. The data transformation module 402 can use, for example, machine learning techniques.

As previously described herein, auditing may be performed by a human. However, in one embodiment, the analytics engine 150 also includes an auditor 312 that can automatically audit flagged claims using pre-established auditing rules. In one such embodiment, the auditor 312 is used to identify flagged claims that may be more important than other claims, as previously mentioned herein. That is, the auditor 312 can, in effect, filter flagged claims so that only selected claims are forwarded to a human auditor. Results from the auditor 312, or from the audit process in general, can be used to identify other claims for evaluation. Results from the auditor 312, or from the audit process in general, are also fed back into the training process 200 to update the models 214, as previously described herein.

The analytics engine 150 can provide other functionality in addition to that just described. For example, the analytics engine 150 can incorporate functionality that permits tracking of the status of unpaid claims or paid claims that need to be recovered or adjusted. For example, the analytics engine 150 can incorporate functionality that allows patients and providers to be automatically contacted once an erroneous claim is identified—in other words, the analytics engine can generate and perhaps send standardized form letters. Also, for example, the analytics engine 150 can provide management and financial reporting functionality.

Furthermore, information regarding the type and frequency of errors can be recorded by the analytics engine 150 so that such information can be subsequently used to perform root cause analyses or to spot emerging trends.

Figure 5:
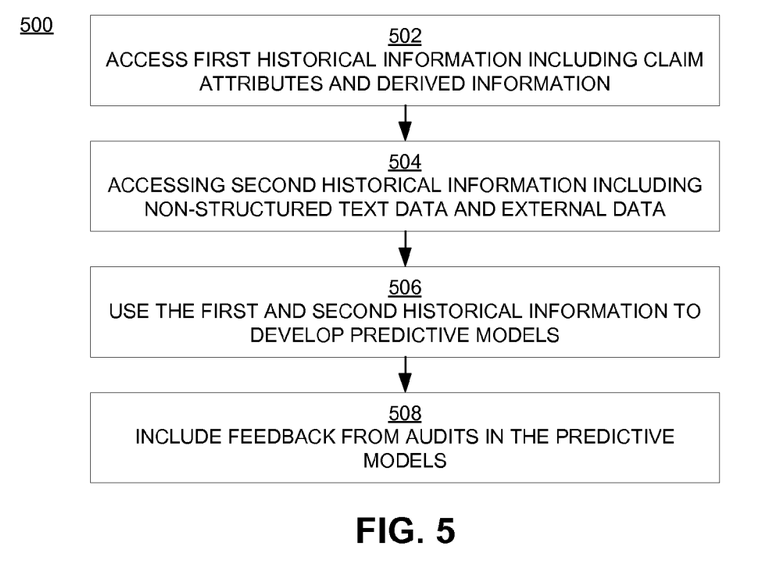
FIGS. 5 and 6 are flowcharts showing steps in computer-implemented methods for processing claims according to embodiments of the present invention.
Figure 6:
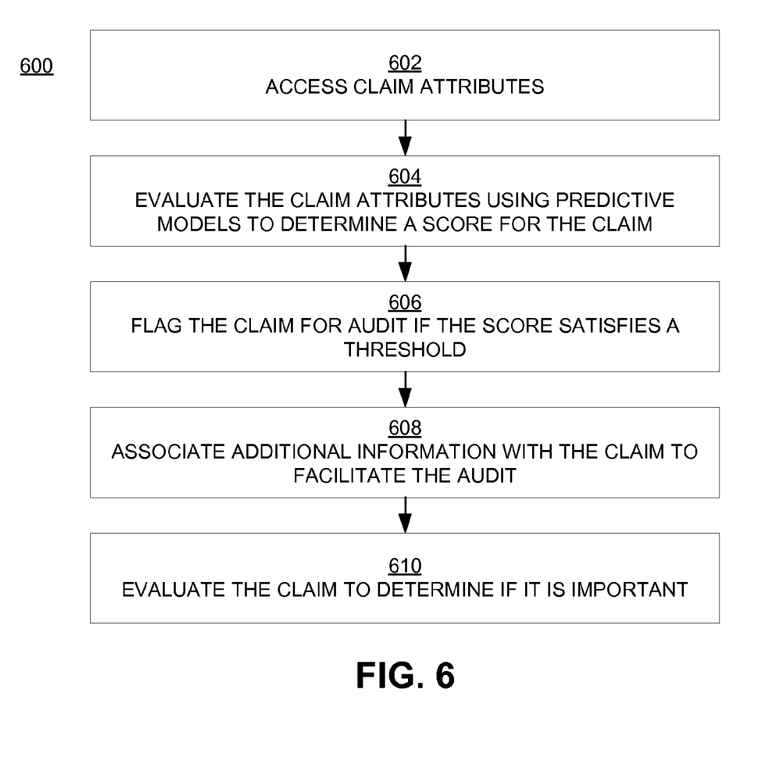

FIGS. 5 and 6 are flowcharts showing embodiments of computer-implemented methods for processing claims. Although specific steps are disclosed in the flowcharts, such steps are examples only. That is, various other steps or variations of the steps recited in the flowcharts can be performed. The steps in the flowcharts may be performed in an order different than presented. Furthermore, the features of the various embodiments described by the flowcharts can be used alone or in combination with each other. In one embodiment, the flowcharts are implemented as computer-readable instructions stored in a computer-usable medium.

With reference first to FIG. 5, in block 502, first historical information associated with a set of claims is accessed. The first historical information includes attributes of the claims and information derived from the claim attributes. Specifically, during a training process, the first historical information includes information in the claims database 202 of FIG. 2.

In block 504, second historical information is accessed. The second historical information includes information in addition to the aforementioned first historical information. Specifically, during the training process, the second historical information includes the unstructured text data 204 and the external data 206 of FIG. 2.

In block 506, using a training process 200 (FIG. 2) such as that described above, the first and second historical information can be combined to develop models 214 that are useful for predicting whether a claim is correct.

In block 508, feedback from an audit of the claim is incorporated into the models 214.

With reference now to FIG. 6, in block 602, attributes of a claim are accessed.

In block 604, the attributes of the claim are evaluated using the models 214 (FIG. 3) to determine a probability that the claim is erroneous. For example, a score is calculated for the claim being evaluated.

In block 606, if the probability (score) satisfies a threshold, then the claim is flagged for further evaluation (e.g., an audit) to determine whether the claim is indeed erroneous.

In block 608, in one embodiment, if the claim is flagged for an audit, then additional information (e.g., a comment or explanation) is associated with the claim, to facilitate the audit. The additional information, generally speaking, is used to highlight in some fashion an attribute or attributes of the claim that likely triggered the audit. The additional information may be, for example, a text-based comment or a non-textual visual cue (e.g., a different color or brightness may be used to highlight an attribute).

In block 610, in one embodiment, if the claim is flagged for an audit, then a measure of improvement to the models 214 is determined prior to the audit. The audit may only be performed if the measure satisfies a threshold value. In other words, an effort can be made to identify important claims, where importance may be defined in any number of ways, with only the more important claims being audited.

In summary, embodiments according to the present invention provide an automated system/tool that allows seamless integration of claims data and other data sets including unstructured text/semantic data from a variety of sources, including Web-based sources and databases. Using that information, an automated analysis of claims can be performed to identify problems before the claim is settled, or to reconcile errors identified after the claim is settled. Moreover, the system/tool can continually learn from the results of the claims analysis. In the long run, less rework will be needed, thereby reducing costs. Also, as accuracy increases, consumer (patient and provider) satisfaction will increase. Errors may be unintentional or intentional (e.g., fraudulent)—by systematically improving the capability to accurately identify errors, fraudulent claims can be more readily identified.

Although described in the context of insurance claims in the healthcare industry, embodiments according to the present invention are not so limited. For example, aspects of the present invention can be applied to insurance claims in other industries. Also, aspects of the invention can be applied to records, files, and other types of forms (other than claim forms) that may be utilized on a regular basis in various types of industries.

The foregoing descriptions of specific embodiments according to the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A non-transitory computer-usable medium having computer-readable components for processing claims, said components comprising:
   a data extraction module operable for extracting claim attribute information from a claims database;
   a plurality of predictive models operable for evaluating attributes of a claim extracted from said claims database;
   computer code operable for flagging the claim in response to a determination by said plurality of predictive models that an attribute associated with the claim is incorrect;

computer code operable for performing a simulation to determine a measure of impact upon a set of predictive models of providing the claim as a training input to the set of predictive models;

computer code operable for forwarding the claim to be audited in response to the claim being flagged and the measure of impact satisfying a first threshold value; and computer code operable for providing the claim as a training input to the plurality of predictive models based on audit feedback indicating that said determination by said predictive models is erroneous.

2. The non-transitory computer-usable medium of claim 1 wherein said plurality of predictive models evaluate said claim using said attributes of said claim and also using data derived from said attributes.

3. The non-transitory computer-usable medium of claim 2 wherein said plurality of predictive models also evaluate said claim using unstructured text-based data and external data, said external data comprising information not included in said claim.

4. The non-transitory computer-usable medium of claim 1 wherein said plurality of predictive models determine a score for said claim, wherein said claim is flagged in response to said score for said claim satisfying a second threshold value.

5. The non-transitory computer-usable medium of claim 1 wherein, in response to forwarding said flagged claim is to be audited, additional information is associated with said flagged claim, said additional information useful for highlighting said attribute.

6. The non-transitory computer-usable medium of claim 1 wherein information associated with said flagged claim is used to select another claim from said claims database.

7. A method of processing claims, said method comprising:

accessing first historical information for a plurality of claims, said first historical information comprising attributes of said claims and information derived from said attributes;

accessing second historical information comprising information that is not an attribute of or derived from said plurality of claims;

analyzing said first and second historical information with a computer system to yield a plurality of computer-implemented models for evaluating an attribute associated with a claim of said plurality of claims;

performing an evaluation of attributes of said claim using said plurality of computer-implemented models;

flagging the claim for an audit in response to a determination by said computer-implemented models that an attribute of the claim is incorrect;

determining whether said audit is to be performed, said determining comprising:

performing a simulation to determine a measure of impact upon a set of predictive models of providing the claim as a training input to the set of predictive models; and comparing the measure of impact to a first threshold value;

forwarding the claim to be audited in response to the claim being flagged and the measure of impact satisfying a first threshold value; and incorporating feedback from said audit into said plurality of computer-implemented models, said feedback comprising information indicating whether said determination is correct.

8. The method of claim 7 wherein said second historical information comprises unstructured text-based data and external data, said external data comprising information not included in said claims.

9. The method of claim 7 further comprising determining a score for said claim; and wherein said flagging said claim for an audit is in response to said score satisfying a second threshold value.

10. The method of claim 7 further comprising associating additional information with said claim, said additional information highlighting an attribute of said claim that is predicted to be incorrect.

11. The method of claim 7 wherein said first and second historical information are separated into training data useful for developing said models and validation data useful for testing said plurality of computer-implemented models.

12. The method of claim 7 further comprising using information associated with said claim to define a search parameter useful for selecting another claim.

13. A non-transitory computer-usable medium having computer-readable program code embodied therein for causing a computer system to perform operations comprising:

accessing attributes of a claim comprising a request for payment of a monetary amount;

using said attributes in a plurality of models to determine a probability that a first attribute associated with said claim is erroneous;

in response to a determination that said probability satisfies a first threshold, flagging the claim for further evaluation to determine whether said first attribute is erroneous;

determining whether said further evaluation is to be performed, said determining comprising:

performing a simulation to determine a measure of impact upon a set of predictive models of providing the claim as a training input to the set of predictive models; and forwarding the claim to be audited in response to the claim being flagged and the measure of impact satisfying a second threshold;

associating additional information with said claim, wherein said additional information is useful for identifying a second attribute of said claim that is potentially a cause of an error in said first attribute; and updating said plurality of models based on feedback from said further evaluation, said feedback comprising information indicating whether said probability is correct.

14. The non-transitory computer-usable medium of claim 13 wherein said operations further comprise deriving data from said attributes and using said data derived from said attributes to determine said probability.

15. The non-transitory computer-usable medium of claim 13 wherein said operations further comprise using unstructured text-based data and external data to determine said probability, said external data comprising information not included in said claim.

16. The non-transitory computer-usable medium of claim 13 wherein said additional information is selected from the group consisting of: a text-based comment; and a non-textual visual cue.

17. The non-transitory computer-usable medium of claim 1 wherein said claim is also forwarded to be audited in response to determining that said claim represents a number of other claims that have attributes deemed to be identical to attributes of said claim.

18. The non-transitory computer-usable medium of claim 1 wherein, when said determination by said plurality of predictive models is correct, then other claims having attributes deemed to be identical to attributes of said claim are selected from said claims database and forwarded to be audited.

* * * * *